Feb. 17, 1925.
C. M. SHIPLEY
1,527,089
CONVERTIBLE BOAT AND AUTO TRAILER
Filed June 25, 1924
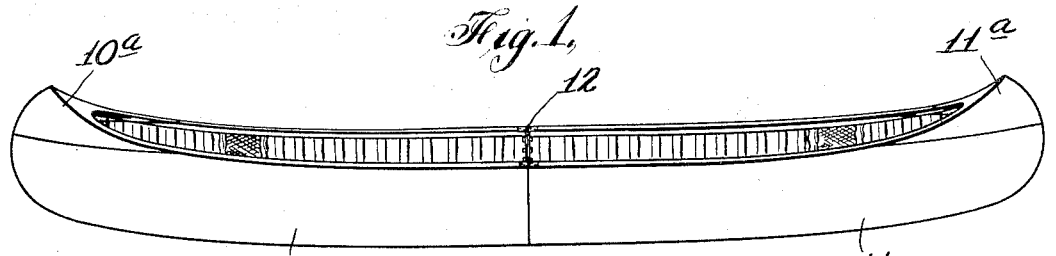
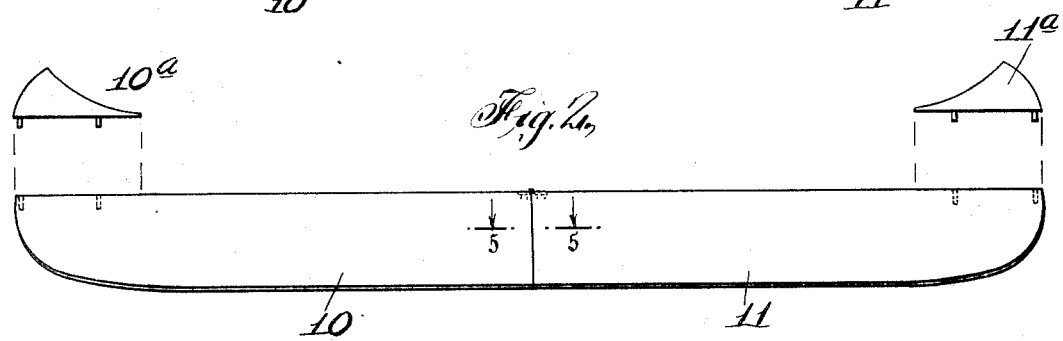
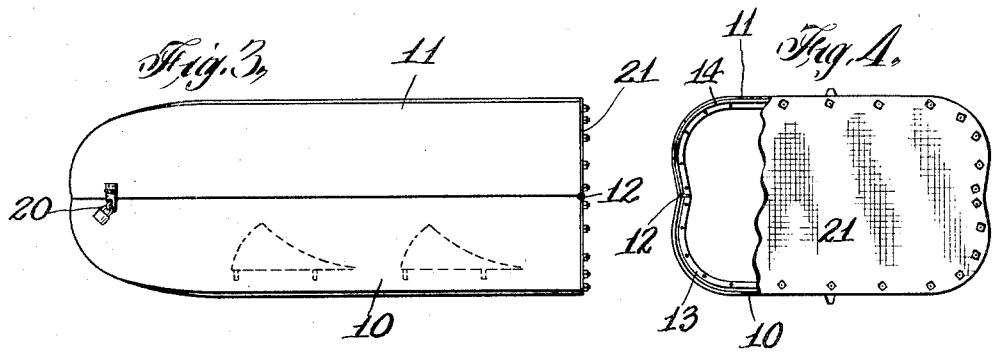
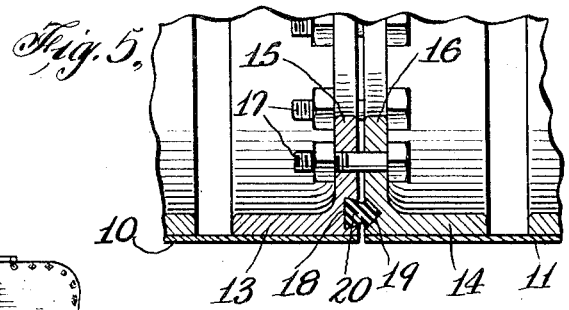
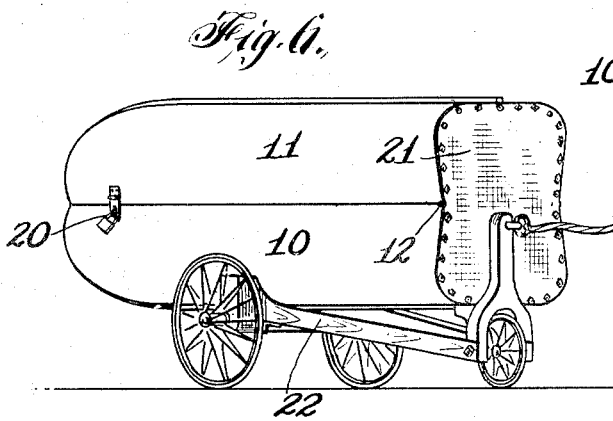
INVENTOR
Curtis M. Shipley
BY
Howard E. Thompson
ATTORNEY Patented Feb. 17, 1925.

1,527,089

UNITED STATES PATENT OFFICE.

CURTIS M. SHIPLEY, OF THERESA, NEW YORK.

CONVERTIBLE BOAT AND AUTO TRAILER.

Application filed June 25, 1924. Serial No. 722,221.

*To all whom it may concern:*

Be it known that I, CURTIS M. SHIPLEY, a subject of the King of Great Britain, and residing at Theresa, in the county of Jefferson and State of New York, have invented certain new and useful Improvements in Convertible Boat and Auto Trailers, of which the following is a specification, such as will enable those skilled in the art to which it appertains to make and use the same.

This invention relates to boats such as canoes, rowboats and the like and particularly to apparatus of this class in which the same may be used as a boat or as an automobile trailer, as a conveyor for or storage for camping material and the like; and the object of the invention is to provide an apparatus of the class specified composed of two movably connected sections which when extended and coupled together will form a strong and durable and practical boat of the canoe or any other type, and which when knocked down or folded may be used as a container for camp outfits or other material or any other practical purpose; a further object being to so construct the boat as to permit of the assemblage of the separate parts thereof in the formation of a receiving and storage receptacle and the use of a closure device for controlling the admission to the receptacle formed by the separate parts of the boat; a still further object being to provide a suitable truck in connection with which the apparatus may be mounted for utilizing the same as a trailer for motor vehicles; a still further object being to provide means for forming a seal between the separate parts of the boat when the same is in use as well as to provide means for reinforcing the adjoining faces of the boat; and with these and other objects in view, the invention consists in an apparatus of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a perspective side view of the boat made according to my invention in its extended position.

Fig. 2 is a side view of the boat with certain parts thereof, detached.

Fig. 3 is a view similar to Fig. 2 with the parts in a collapsed position.

Fig. 4 is an end view of the construction shown in Fig. 3 with part of the construction broken away.

Fig. 5 is a partial section on the line 5—5 of Fig. 2 and on an enlarged scale.

Fig. 6 is a perspective detail view of the apparatus as shown in Figs. 3 and 4 of the drawing mounted upon a truck, forming a trailer for a motor vehicle.

For the purpose of illustrating one use of my invention I have shown in the accompanying drawing a boat of the canoe type and in practice the boat is constructed of two substantially similar members 10 and 11, hinged together centrally where they abut as shown at 12, and the members 10 and 11 are substantially of the same form and construction as canoes which are commonly known except that the opposite end portions of the said members are provided with detachable parts 10ª and 11ª forming the finished curved ends to the boat and which may be retained in position in any desired manner.

The separate members 10 and 11 of the boat are reinforced where they abut by two reinforcing members 13 and 14, L-shaped in form in cross section, two of the flanges 15 and 16 of which are in parallel relation and are secured together by bolts 17 of any kind or class. The flanges 15 and 16 are also preferably recessed throughout as shown at 18 and 19, and mounted in the recess 18 is a packing gasket 20 which projects beyond the flange 15 and cooperates with the recess 19 of the flange 16 to form a seal between the separate members 10 and 11 to prevent the passage of water into the boat.

An apparatus constructed in the manner above set out will be light in construction and yet strong and durable, and may be practically used for the purpose for which it is intended. Whenever desired, the bolts or other fastening means 17 employed may be loosened or removed and the members 10 and 11 moved one upon the other or in other words the part 11 upon the part 10 on the hinge 12 after the members 10ª and 11ª have been removed to form of the apparatus a luggage container, which is closed on the sides and at one end, by the structure of the boat proper, and the separate members 10 and 11, if desired, may be secured together at their free ends by a latch and lock device 20 as shown in Figs. 3 and 6 of the drawing. The open end of the members 10 and 11 may be closed by a flexible door member 21 which may be detachably mounted upon the bolts 17 or may be detachably coupled in any other desired manner common in the use of removable curtains and the like. As these devices form no part of my invention, no specific form of device is shown.

It will be apparent from the foregoing that the members 10 and 11 when folded or moved into the position shown in Figs. 3, 4 and 6 of the drawing may be used in a practical way for the storage of luggage, baggage, camp equipment or other articles of this kind or class and mounted upon any kind or class of truck 22 which may be coupled with a motor vehicle whereby the entire mechanism may be used as a trailer therefor.

In addition to the above specific features of my construction, another distinctive feature resides in the provision of a boat in which the interior thereof is not obstructed in any way at the point of the coupling of the separate members 10 and 11 together. The inwardly projecting flanges 15 and 16 which extend around the central portion of the hull are the only prevailing obstructions, but will not be sufficient to interfere with the compartment within the boat, and while in the accompanying drawing, a three-wheel truck has been shown to diagrammatically illustrate the invention or one method of carrying the invention into effect, it will be understood that any shape or construction of boat may also be employed, and other changes in and modifications of the construction herein shown and described may be made within the scope of the appended claims, without departing from the spirit of my invention or sacrificing its advantages.

Having fully described my invention, what I claim as new and desire to secure by Letters-Patent, is:—

1. An apparatus of the class described comprising two substantially similar members, the adjacent faces of which are open, means for movably connecting like ends of said members whereby said members may be extended to form a boat and whereby said members may be placed one upon the other to form a container open at the joined end portions of said members.

2. An apparatus of the class described comprising two substantially similar members, the adjacent faces of which are open, means for movably connecting like ends of said members whereby said members may be extended to form a boat and whereby said members may be placed one upon the other to form a container open at the joined end portions of said members, and means for reinforcing said members where joined together.

3. An apparatus of the class described comprising two substantially similar members the adjacent faces of which are open, means for movably connecting like ends of said members whereby said members may be extended to form a boat and whereby said members may be placed one upon the other to form a container open at the joined end portions of said members, means for reinforcing said members where joined together, and means for securely coupling said members together when in extended position.

4. An apparatus of the class described comprising two substantially similar members the adjacent faces of which are open, means for movably connecting like ends of said members whereby said members may be extended to form a boat and whereby said members may be placed one upon the other to form a container open at the joined end portions of said members, means for reinforcing said members where joined together, means for securely coupling said members together when in extended position, and means for providing a seal between said members in such position.

5. An apparatus of the class described comprising two substantially similar members the adjacent faces of which are open, means for movably connecting like ends of said members whereby said members may be extended to form a boat and whereby said members may be placed one upon the other to form a container open at the joined end portions of said members, means for reinforcing said members where joined together, means for securely coupling said members together when in extended position, means for providing a seal between said members in such position, and means detachably mounted in connection with the free ends of said members for forming finished ends to the boat.

6. An apparatus of the class described comprising two substantially similar members the adjacent faces of which are open, means for movably connecting like ends of said members whereby said members may be extended to form a boat and whereby said members may be placed one upon the other to form a container open at the joined end portions of said members, means for reinforcing said members where joined together, means for securely coupling said members together when in extended position, means for providing a seal between said members in such position, means detachably mounted in connection with the free ends of said members for forming finished ends to the boat, and means for closing the open end of the container formed by said members.

7. A boat of the class described divided centrally to form two boat members of substantially the same form and construction, the adjacent faces of which are open to provide a continuous compartment extending through both members and means for securing the separate boat members together in extended position to form a boat thereof.

8. A boat of the class described divided centrally to form two boat members of substantially the same form and construction, the adjacent faces of which are open to provide a continuous compartment extending through both members, means for securing the separate boat members together in extended position to form a boat thereof, and means for reinforcing the abutting edge portions of said boat members.

9. A boat of the class described divided centrally to form two boat members of substantially the same form and construction, the adjacent faces of which are open to provide a continuous compartment extending through both members, means for securing the separate boat members together in extended position to form a boat thereof, means for reinforcing the abutting edge portions of said boat members, and a seal formed between the abutting faces of said boat members.

10. A boat of the class described divided centrally to form two boat members of substantially the same form and construction, means for securing the separate boat members together in extended position to form a boat thereof, said boat members being adapted to be placed one upon the other to form a container open at one end, and means detachably mounted in connection with said members for closing the open end of the container formed thereby.

11. A boat of the class described divided centrally to form two boat members of substantially the same form and construction, means for securing the separate boat members together in extended position to form a boat thereof, said boat members being adapted to be placed one upon the other to form a container open at one end, means detachably mounted in connection with said members for closing the open end of the container formed thereby and a truck on which the container is adapted to be mounted to form a trailer thereof.

12. A combination boat and trailer of the class described comprising an elongated boat-shaped body having a compartment extending continuously throughout its length, said body being divided centrally to form separate boat members of similar shape and dimensions, and means involving reinforcing members for securing the separate boat members together where they abut.

13. A combination boat and trailer of the class described comprising an elongated boat-shaped body having a compartment extending continuously throughout its length, said body being divided centrally to form separate boat members of similar shape and dimensions, means involving reinforcing members for securing the separate boat members together where they abut, and means for forming a seal between the abutting faces of said members.

14. A combination boat and trailer of the class described comprising an elongated boat-shaped body having a compartment extending continuously throughout its length, said body being divided centrally to form separate boat members of similar shape and dimensions, means involving reinforcing members for securing the separate boat members together where they abut, means for forming a seal between the abutting faces of said members and the free ends of said boat members being provided on their upper faces with removable portions whereby the upper face of one boat member may be placed upon and lie flushly with the upper face of the other boat member.

15. A combination boat and trailer of the class described comprising an elongated boat-shaped body having a compartment extending continuously throughout its length, said body being divided centrally to form separate boat members of similar shape and dimensions, means involving reinforcing members for securing the separate boat members together where they abut, means for forming a seal between the abutting faces of said members and the free ends of said boat members being provided on their upper faces with removable portions whereby the upper face of one boat member may be placed upon and lie flushly with the upper face of the other boat member, to form of said boat members a container open at one end, and means detachably mounted in connection with said boat members for closing the open end of said container.

16. A combination boat and trailer of the class described comprising an elongated boat-shaped body having a compartment extending continuously throughout its length, said body being divided centrally to form separate boat members of similar shape and dimensions, means involving reinforcing members for securing the separate boat members together where they abut, said reinforcing members comprising angle iron strips fashioned to conform with the inner contour of said boat members and secured thereto, means for forming a seal between the abutting faces of said members and the free ends of said boat members being provided on their upper faces with removable portions whereby the upper face of one boat member may be placed upon and lie flushly with the upper face of the other boat member to form of said boat members a container open at one end, means detachably mounted in connection with said boat members for closing the open end of said container, and a truck on which the container formed by said boat members is adapted to be mounted to form a trailer thereof.

In testimony that I claim the foregoing as my invention I have signed my name this 23rd day of June 1924.

CURTIS M. SHIPLEY.